United States Patent [19]

Prenner et al.

[11] Patent Number: 4,544,855
[45] Date of Patent: Oct. 1, 1985

[54] GAS COOLED ALTERNATING CURRENT MACHINE

[75] Inventors: Herbert Prenner, Windisch; Paul Schröder, Wettingen, both of Switzerland

[73] Assignee: BBC Brown, Boveri & Company Limited, Baden, Switzerland

[21] Appl. No.: 586,394

[22] Filed: Mar. 5, 1984

[30] Foreign Application Priority Data

Mar. 10, 1983 [CH] Switzerland ................. 1304/83

[51] Int. Cl.$^4$ .............................................. H02K 9/00
[52] U.S. Cl. ...................................... 310/59; 310/62; 310/65; 310/89
[58] Field of Search ............... 310/52, 53, 55, 57, 310/58, 59, 60 R, 62, 63, 64, 65, 89, 258; 165/108

[56] References Cited

U.S. PATENT DOCUMENTS

| | | | |
|---|---|---|---|
| 1,269,537 | 6/1918 | Holcombe | 310/63 |
| 2,742,582 | 4/1956 | Bahn | 310/52 |
| 2,920,218 | 1/1960 | Beckwith | 310/64 |
| 3,439,202 | 4/1969 | Wanke | 310/55 |
| 3,751,699 | 8/1973 | Gleichman | 310/58 |
| 3,809,934 | 5/1974 | Baer | 310/53 |
| 4,348,604 | 9/1982 | Thode | 310/62 |
| 4,443,723 | 4/1984 | Ohkubo | 310/59 |

OTHER PUBLICATIONS

Wiedemann/Kellenberger, "Konstruction Electrischer Machinen", Spring Verlag, Berlin, Heidelberg, New York, 1967, p. 548.

Primary Examiner—R. Skudy
Attorney, Agent, or Firm—Oblon, Fisher, Spivak, McClelland & Maier

[57] ABSTRACT

A gas-cooled a.c. machine having a rotor and a stator, each in the form of sheet metal packs, and a winding head, wherein in order to obtain optimum cooling of the rotor sheet metal pack, the stator sheet metal pack and the winding head, the machine is constructed of a stator central part and two stator end parts and ducts are provided in the casing corners for the removal of the cooling gas. The ducts are bounded only by the walls of the casing and the back of the stator sheet metal pack, are separated by the stator sheet metal pack, and extend over the total length thereof. Cooling gas conveyed by fans is first conveyed into the inner winding head chamber or the rotor inlet flow chamber and there divided into two cooling circuits connected in parallel. In a first cooling circuit, the cooling gas is led through the rotor sheet metal pack and through the stator sheet metal pack, and in the second cooling circuit through the winding head. The stator end parts are each formed as cooling gas inlet and outlet casings and are provided with separating walls for separating the two cooling circuits. The separating walls have by-pass openings whose respective effective cross-sectional areas can be varied by displaceable cover plates.

7 Claims, 6 Drawing Figures

GAS COOLED ALTERNATING CURRENT MACHINE

BACKGROUND OF THE INVENTION

1. Field of the Invention

The invention concerns a gas cooled alternating current machine having a stator central part and two stator end parts and, with a fan at each rotor end, the stator sheet metal pack which forms the central part and is clamped between two end plates being subdivided by radially extending cooling ducts into individual partial packs, the cooling ducts being formed by distance protrusions or pins which are fastened to one partial pack end sheet on one duct side, and the stator sheet metal pack being surrounded by a casing.

2. Description of the Prior Art

An electrical machine of the above described generic type is known, for example, from the book by Wiedemann/Kellenberger "Konstruktion elektrischer Maschinen", Springer-Verlag, Berlin, Heidelberg, New York, 1967, page 548, FIG. 473b.

The cooling gas conveyed by the fans flows, on the one hand, through the winding head area and cools the winding heads and, on the other hand, is conducted through axial and radial cooling ducts of the rotor body and through radial cooling ducts of the stator body and also cools the rotor and stator bodies. After the cooling gas emerges from the radial cooling ducts of the stator body and after the passage of the cooling gas from the winding head area through the stator sheet metal body press plates, it arrives in the cooling gas outlet flow area in the central part of the electrical machine. The cooling gas outlet flow area is located between the stator back and the machine casing. Cooling gas escapes from there into the open air or is led to a cooling installation outside the machine for recooling the heated cooling gas.

In the case of an electrical machine whose cooling gas outlet flow areas are, for design reasons, subdivided by the stator sheet metal pack into individual sections, separated from one another in the peripheral direction over the complete axial length, i.e. where there is no annular space between the sheet metal pack and the machine casing, the cooling gas removal system described is only possible under conditions of increased difficulty. This applies both to direct cooling gas removal into the open air from each section of the outlet flow area and to a system connecting the individual sections to one another, with central removal of the cooling gas. In the first case, heated cooling gas would escape at several points from the machine, which, on the one hand, would pollute the environment and make recooling of the warmed cooling gas impossible and, in the second case, additional components, particularly pipework and connecting parts, would be necessary, which additional components have to be attached to the outside of the machine casing. This would, however, produce additional flow paths for the cooling gas and these additional flow paths moreover can not be integrated directly into the stator body. In addition, protective coverings would have to be provided for this externally located connecting pipework and a larger space requirement would be needed for the central part of the electrical machine.

SUMMARY OF THE INVENTION

Accordingly, one object of this invention is to provide a novel cooling system for electrical machines whose cooling gas outlet flow area is interrupted between the stator back and the machine casing over the complete axial length of the stator central part and is subdivided into individual partial cooling gas outlet flow area which are not connected to one another, by means of which cooling system both the stator winding heads and the rotor and stator bodies are optimally cooled using simple means, and the cooling system can be integrated in a simple manner into the structural shape of the electrical machine.

This object is attained according to the invention by providing a novel machine of the type previously described, wherein ducts for the removal of the cooling gas are formed in the casing corners, which ducts are bounded only by the walls of the casing and the backs of the sheet metal pack, are separated by the sheet metal pack and extend over the total length of the sheet metal pack; the stator end parts are formed both as cooling gas inlet and cooling gas outlet casings, each having a height corresponding approximately to that of the stator central part and a width which protrudes on both sides relative to the stator central part, and which casing is substantially subdivided by separating walls and the shell into four chambers, including a cooling gas induction chamber, a winding head chamber and a pair of cooling gas outlet flow chambers located symmetrically about a vertical plane; each cooling gas outlet flow chamber has at least one outlet flow opening each being connected to a lower duct and an upper duct of the stator central part via a respective penetration in the end plates of the stator central part; the separating walls in each stator end part 2a, 2b between the winding head chamber and the two cooling gas outlet flow chambers are located in pairs and symmetrically about the vertical plane and separate the winding head chamber and the cooling gas outlet flow chambers from one another; and the separating walls are provided with by-pass openings through which the cooling gas is led in a first cooling branch through the rotor and the stator and in a second parallel cooling branch through the winding head.

The advantages obtained due to the invention are, in the main, the following:

All the machine parts are optimally cooled by parallel connections and deliberate guidance of two cooling gas flow paths, namely one through the rotor and stator bodies and the other through the winding head.

The arrangement of the stator end parts as cooling gas entry and outlet casings and the integration of the cooling system within the machine casing provides a compact machine design with central cooling gas supply and removal in each one of the two stator end parts, whereby it is possible by this means to do without all the additional components outside the machine casing.

In accordance with a first further development according to the invention, the external contour of the sheet metal pack has a circular shape or the shape of an approximately axisymmetric n-sided polygon with n greater than 6, the outer surfaces of the sheet metal body running parallel to the casing walls are in contact with their associated casing walls and are supported by the casing walls in a radial direction. The walls of the casing protruding beyond the side surfaces of the sheet metal pack are solidly connected to one another and form the ducts for the removal of the cooling gas. These ducts extend over the complete length of the sheet metal pack. Further, the separating walls in the stator end parts extend in the axial direction from the end plates to the shell allocated to the fans. The cross-section of the separating walls coincides approximately with the external contour of the stator metal sheet or the separating walls lie outside the hypothetical cylinder obtained by the inscribed circle on the sheet metal external contour, and the separating walls are in contact with the appropriate internal side of the lower and upper casing wall of the stator end parts. Bypass openings approximately evenly distributed over the periphery are located in each case in the separating walls and means are provided for varying their effective cross-sectional areas. Further, the separating walls in the stator end parts each have a vertical central part and angled lower and upper parts which extend in the axial direction from the end plates as far as the shell allocated to the fans. The separating walls are congruent with the external contour of the six side edges of the axisymmetric octagon of the sheet metal pack, and there is a bypass opening located in the center of the central and angled lower and upper parts of the separating walls.

The first further development of the invention makes possible a compact construction of the stator central and stator end parts without substantially increasing the shaft centreline height and machine overall width.

In accordance with a further development of the invention, the means for varying the effective cross-sectional area of the by-pass openings to control the cooling gas quantity includes cover plates, which are displaceably located over the by-pass openings on a guide arrangement. The advantage of this further development consists in the fact that, using simple construction of the cover plates and easy manual handling, it is possible to directly influence the cooling system, particularly the distribution of the cooling gas quantities flowing in the two cooling branches.

Further according to the invention, the ratio, in the cooling gas outlet flow chamber, of the sum of the free cross-sectional areas of the by-pass openings to the sum of the cross-sectional areas of the penetrations is in the range from 0.15 to 0.3.

Further according to the invention, in the cooling gas outlet flow chamber, the cross-sectional area of the central part of the cooling gas outlet flow chamber, which is given by the distance of the vertical central part of the separating wall from the casing wall of the stator end part and the axial length of the separating wall, expressed as a ratio to the sum of the cross-sectional area $S1$ of the lower penetration, the free cross-sectional area $S3$ of the by-pass opening located in the lower angled part of the separating wall and half the free cross-sectional area $S4$ of the by-pass opening located in the central part of the separating wall, is greater than 1.

The advantage of the invention in accordance with the above noted ratios consists particularly in that this dimensioning of the free cross-sectional areas of the penetrations and by-pass openings takes account of the flow resistance and, therefore, of the cooling gas quantity flowing through the individual cooling branches with respect to optimum cooling of all the machine parts to be cooled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
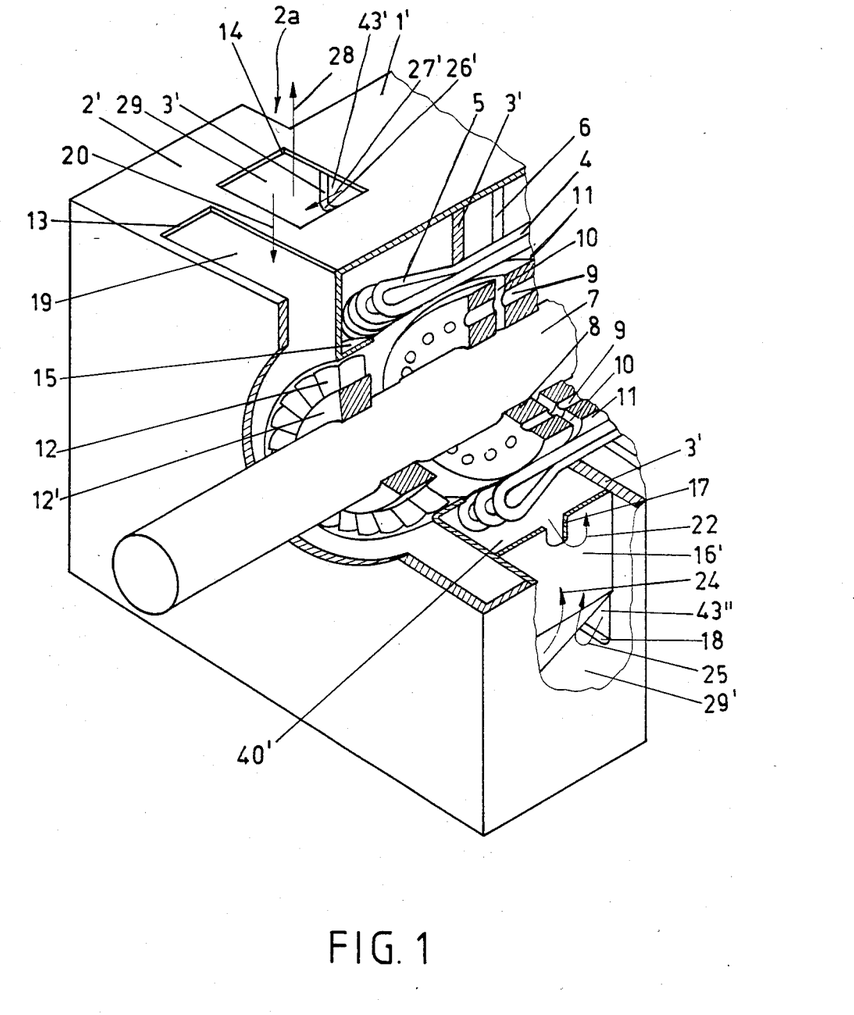
FIG. 1 is an axonometric, partially sectioned view of the stator end part 2a on the drive side and, in part, of the stator central part 1.
Figure 2:
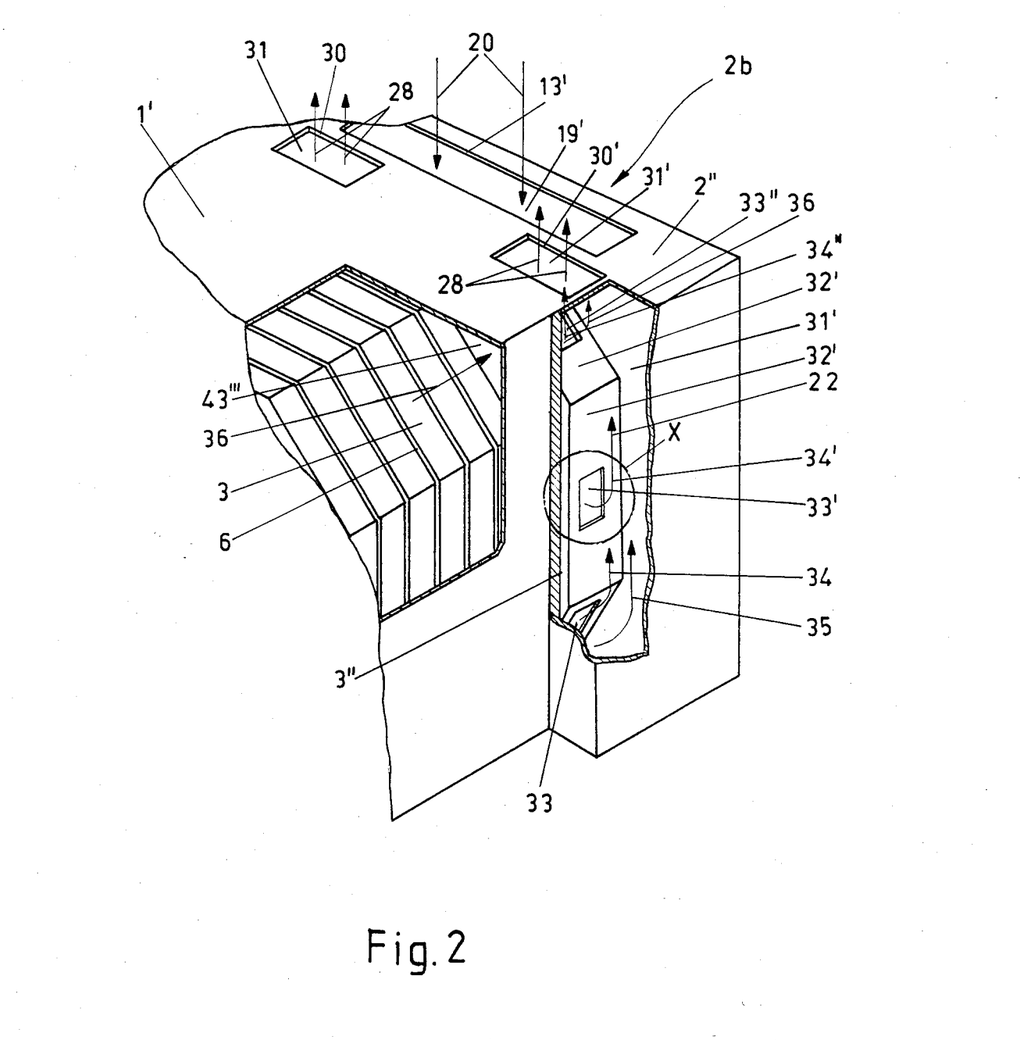
FIG. 2 is an axonometric partially sectioned view of the stator end part 2b opposite to the drive side and, in part, of the stator central part 1.

Referring now to the drawings, wherein like reference numerals designate identical or corresponding parts throughout the several views, and more particularly to FIG. 1 thereof, which shows the stator end part 2a on the drive side and part of the stator central part 1 and FIG. 2 which shows the stator end part 2b located opposite to the drive side and, again, a part of the stator central part 1 in axonometric and, in part, in sectional representation. The height of the two stator end parts 2a, 2b corresponds approximately to that of the stator central part 1 but they protrude on both sides relative to the stator central part 1. The stator central part 1 consists, in the illustrative embodiment according to the invention shown in FIGS. 1 and 2, of a sheet metal pack 3, which is bounded at its end surfaces by the end plates 3', 3" and whose external contour has the shape of an approximately axisymmetric octagon, each second outside surface in series of the sheet metal pack 3 being in contact with its associated casing wall 1'. The casing walls 1' protruding beyond the outside surfaces of the sheet metal pack 3 form prismatic ducts 43, 43', 43", 43'" over the total length of the stator central part 1. Part of the polygon shaped sheet metal pack 3 and the prismatic duct 43'" can be seen in FIG. 2. The stator sheet metal pack 3 has radial cooling ducts 6 which subdivide the sheet metal pack 3 into individual partial packs. This can be particularly well seen in FIG. 2.

The rotor sheet metal pack 8 is, as shown in FIG. 1, located on the shaft 7. The rotor sheet metal pack 8 is provided with axial cooling ducts 9 and radial cooling ducts 10. For reasons of clarity, the rotor winding has been omitted in FIG. 1. However, the stator winding 4 is shown and this becomes the winding head 5 outside the end plate 3' in the stator end part 2a. The air gap between the rotor sheet metal pack 8 and the stator sheet metal pack 3 is indicated by the reference number 11.

In each of the stator end parts 2a, 2b in accordance with FIGS. 1 and 2, there is an axial fan 12 which is attached to the shaft 7 by means of its hub 12' for conveying a cooling medium towards the stator and the rotor. The axial fan 12 can only be seen in the stator end part 2a in FIG. 1 and a shell 15 for cooling medium guidance is allocated to it. The two stator parts 2a, 2b are each subdivided into four chambers, which can only be seen in part in FIGS. 1 and 2 because of their axonometric sectioned representations. They are represented comprehensively and clearly in the subsequent FIGS. 4 and 5.

These four chambers are: the induction chamber 19, 19', the winding head chamber 40, 40' and two cooling gas outlet flow chambers located in pairs symmetrically about the vertical plane—29, 29' for the stator end part 2a and 31, 31' for the stator end part 2b. The left-hand cooling gas outlet flow chamber 29 can be seen only from outside in FIG. 1, while the upper part of the right-hand cooling gas outlet flow chamber 29' has been cut away, so that only the lower part of this chamber 29' can be seen. In FIG. 2, only the right-hand cooling gas outlet flow chamber 31' can be seen.

The arrows shown with reference numbers in FIGS. 1 and 2 indicate the cooling gas flow direction of the cooling system in accordance with the invention. In the description of the operating mode of the system, which follows the description of the subsequent figures, reference will be made to the cooling gas flow direction in accordance with FIGS. 1 and 2.

Figure 3:
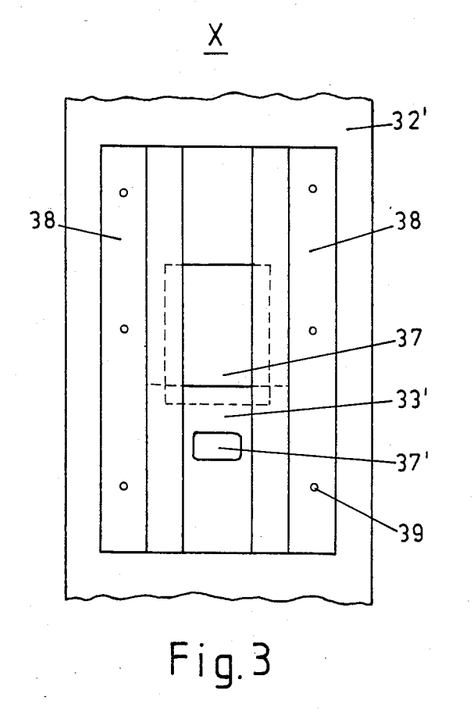
FIG. 3 is a magnified plan view of the excerpt X in accordance with FIG. 2.

FIG. 3 shows a magnified plan view of the excerpt X in accordance with FIG. 2 but not in axonometric representation. The free cross-sectional area of the by-pass opening 33' can be controlled by means of the cover plate 37 using the actuating lever 37'. The cover plate 37 is displaceably located within guide rails 38. The guide rails 38 are, for example, connected to the separating wall 32' by means of spot welding at the positions 39. In this manner, all the by-pass openings 17, 23, 23', 23''; 33, 33', 33'' occurring in the cooling circuit at both stator end parts 2a, 2b can be controlled. In FIGS. 1 to 6, only part of the by-pass openings actually occurring in the stator end parts 2a, 2b are represented, i.e. the by-pass opening 17 in the right-hand part of the stator end part 2a in accordance with FIG. 1, the by-pass openings 33, 33', 33'' in the right-hand part of the stator end part 2b in accordance with FIG. 2 and the by-pass openings 23, 23', 23'' in the left-hand part of the stator end part 2a in accordance with FIG. 6.

Figure 4:
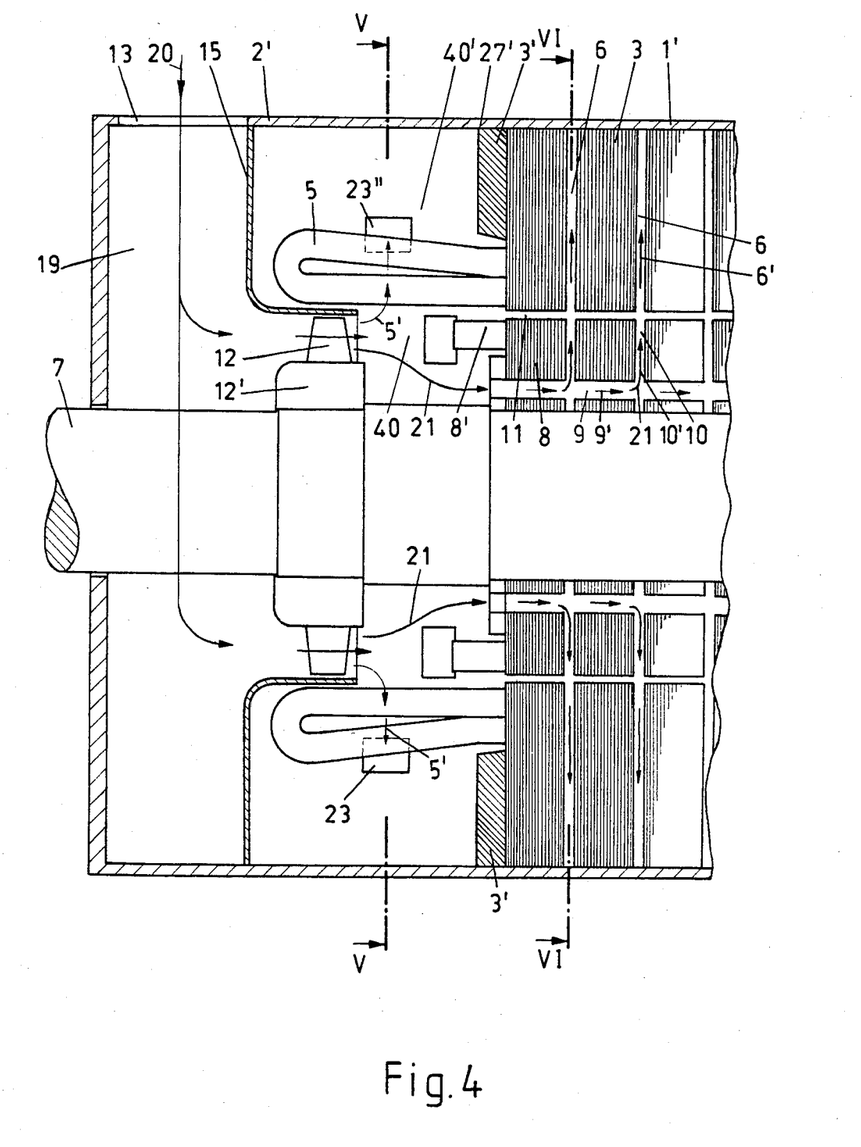
FIG. 4 is a longitudinal sectional view through the stator end part 2a on the drive side and, in part, through the stator central part 1.

FIG. 4 is a longitudinal sectional view through the machine end part 2a on the drive side and, in part, through the central part 1. The separation of the induction chamber 19 from the winding head chamber 40 by the annular shell 15 can be clearly seen in this figure. In this diagram, the winding head chamber 40 is subdivided in still greater detail into the inner winding head chamber 40 and the outer winding head chamber 40', the inner winding head chamber 40 being identical with the actual rotor inlet flow area. The separation of the winding head chamber 40 from the cooling gas outlet flow chamber 29 by the separating wall 16 can be seen from FIG. 5. In FIG. 4, lower and upper by-pass openings 23, 23'' are only indicated and, furthermore, they differ from those of the illustrative embodiment in accordance with FIGS. 1 and 2 in both height and width. It is self-evident that the dimensioning and number of the by-pass openings 17, 23, 23', 23''; 33, 33', 33'' in each separating wall 16, 16', 32 depends on the machine type in each case and the cooling effect to be attained in the individual parts of the machine. FIG. 4 also shows the rotor winding head 8' emerging from the rotor sheet metal pack 8.

Figure 5:
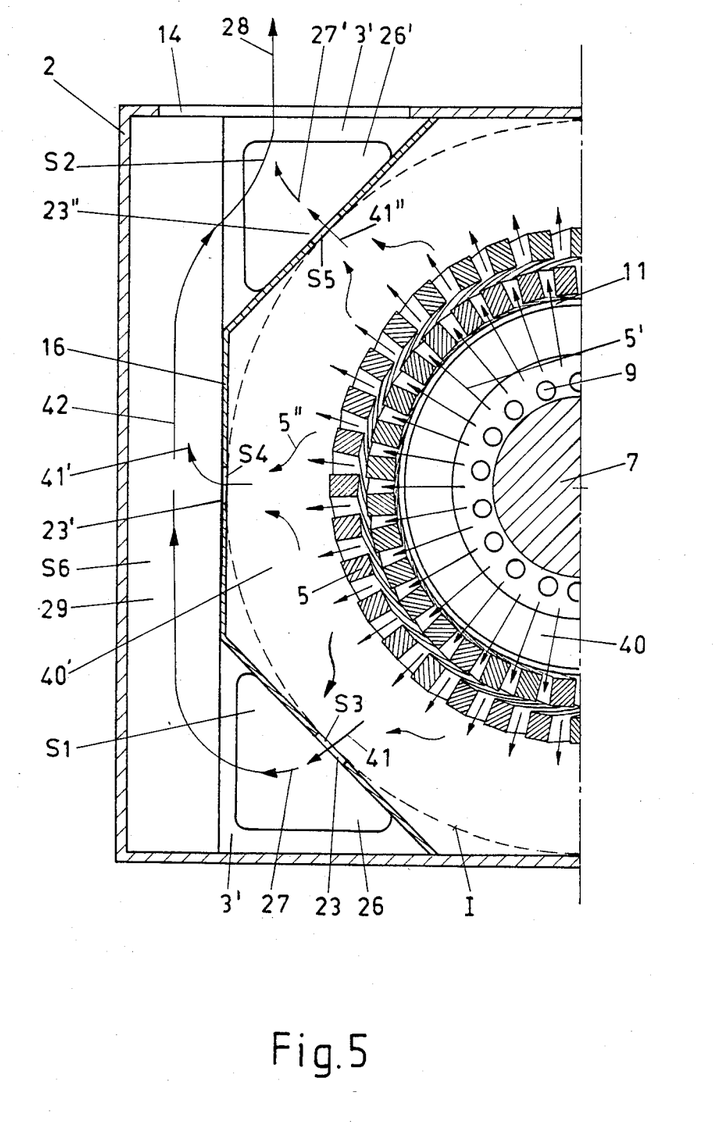
FIG. 5 is a cross-sectional view through the stator end part 2a in accordance with FIG. 4 (section plane V—V of FIG. 4)

FIG. 5 is a cross-sectional view through the stator end part 2a in accordance with FIG. 4, and shows clearly the separation of the winding head chamber 40 from the cooling gas outlet flow chamber 29 by the separating wall 16. The separating wall 16 has the shape of part of a symmetrical octagon and is congruent with the outside surface of the sheet metal pack 3. The central section of the outlet flow chamber 29, which is formed by the parallel surfaces of the separating wall 16 and the casing 2 of the stator end part 2a, is located in the part of the stator end part 2a protruding relative to the stator central part 1. The winding head chamber 40 is subdivided by the winding head 5 into the inner winding head chamber 40, which simultaneously forms the rotor inlet flow chamber, and the outer winding head chamber 40'.

The cover plates 37 on the by-pass openings 23, 23', 23'' are again omitted in FIG. 5 for reasons of clarity. Also in FIG. 5, both the lower penetration 26 and the upper penetration 26' are visible, which penetrations connect the prismatic ducts 43, 43' in the corners of the stator central part 1, which ducts are not shown in FIG. 5, to the cooling gas outlet flow chamber 29. In FIG. 5, the separating wall 16 is coincident with the outside surface of the stator sheet metal pack 3. It is, however, also possible for the separating wall 16 and also all the other separating walls 16', 32 of the stator end parts 2a, 2b to be designed, for example, to be convex with respect to the shaft axis. The important point is that the separating walls 16, 16', 32 do not lie within the circle I inscribed within the stator sheet metal external contour. Only three separating walls are shown in FIGS. 1, 2 and 5, these being the separating wall 16' in the right-hand part of the stator end part 2a in FIG. 1, the separating wall 32' in the right-hand part of the stator end part 2b in FIG. 2 and the separating wall 16 in the left-hand part of the stator end part 2a in FIG. 5. It is self-evident that there is also a separating wall in the left-hand part of the stator end part 2b, which is however, not visible in FIGS. 1 to 6.

Figure 6:
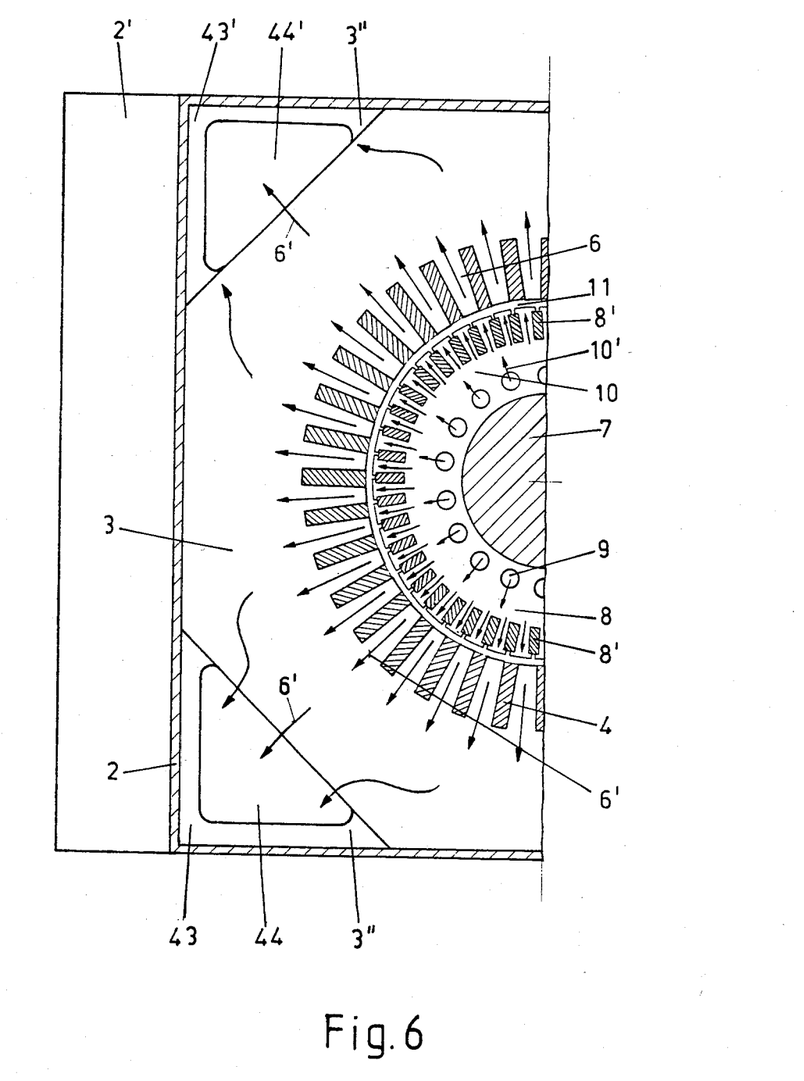
FIG. 6 is a cross-sectional view through the stator central part 1 in accordance with FIG. 4 (section plane VI—VI).

Finally, FIG. 6 is a cross-sectional view through the stator central part 1 in accordance with FIG. 4. The lower prismatic duct 43 and the upper prismatic duct 43' can be clearly seen in FIG. 6, as can their penetrations 44, 44' in the end plate 3'', which provide the connection between the prismatic ducts 43, 43' and the left-hand cooling gas outlet flow chamber of the stator end part 2b. This cooling gas outlet flow chamber is, as already mentioned, not visible in FIGS. 1 to 6. However, the part of the stator end part 2b protruding relative to the stator central part 1, in which protruding part this left-hand cooling gas outlet flow chamber is located, can be easily seen.

The cooling system in accordance with the invention is described in more detail below.

It should be noted in general that in the cooling system according to the invention, an axial fan 12 is located in each of the stator end parts 2a, 2b, the cooling gas flow being symmetrically conveyed, starting from the stator end parts 2a, 2b and ending approximately at the center of the stator central part 1. In general, air is a suitable cooling medium but, for particular machine types and applications, other gases, for example $H_2$, can be employed for cooling. The units necessary for this purpose, however, lie outside the scope of the subject matter of the present invention and are not dealt with here.

In accordance with FIGS. 1 and 4, the cooling gas is induced through the front cooling gas inlet flow opening 13 in the arrow direction 20 in the vertical direction into the cooling gas inlet flow chamber 19 of the stator end part 2a by the axial fan 12, is deflected into the axial direction and conveyed into the inner winding head chamber 40. In the inner winding head chamber 40, which is simultaneously the rotor inlet flow chamber, the cooling gas is divided into two flow paths in accordance with FIG. 4. In a first cooling gas flow, the major part of the cooling gas is further conveyed in the arrow direction denoted by the reference numeral 21 in the axial direction into the rotor inlet flow chamber 40. A second cooling gas flow passes in accordance with the arrow direction with the reference number 5' radially outwards and flows through the passage areas of the winding head 5, cooling the latter.

The cooling gas flow 21 passes into the axial cooling ducts 9, flows in the arrow direction 9', is subsequently deflected into the radial ducts 10 (flow direction 10'), passes through the air gap 11 and flows through the stator ducts 6 (flow direction 6').

In accordance with FIG. 6, the cooling gas now flows to the back of the stator, which, with the axisymmetric octagonal shape of the stator sheet metal pack 3 on which the invention is based, permits free passage for the cooling gas only on four outside surfaces, these being the ones which are not in contact with the casing wall 1' of the stator central part. Due to a design, which is favorable to flow, of the distance protrusions located in the radial cooling ducts 6 in the stator sheet metal pack 3, the main flow of the cooling gas is deflected to the four outside surfaces not covered by the casing 1' of the stator central part 1, so that vortices or similar flow hindrances are substantially avoided on the back of the stator.

As may be seen in FIG. 6, after leaving the cooling duct 6' of the stator sheet metal pack 3, in which it flowed substantially radially and in part also tangentially corresponding to the arrow direction with the reference number 6', the cooling gas passes into the prismatic design corner chambers 43, 43', which are bounded by the stator back and the casing 1' of the stator central part 1 and subsequently flows from the stator central part 1 to the two stator end parts 2a and 2b respectively.

The cooling gas flow of the second flow path flows, as already mentioned, through the winding head 5 in radial direction outwards and passes into the outer winding head chamber 40', which, as can be well seen in FIG. 5, is separated by the separating wall 16 from the outlet flow chamber 29. Both chambers 40', 29, however, are in connection with one another over the by-pass openings 23, 23', 23'' in the separating wall 16. The cooling gas is now led, corresponding to the direction of the arrows denoted by the reference numbers 41, 41', 41'', through the by-pass openings 23, 23', 23'' into the outlet flow chamber 29.

As shown in FIG. 5, the two partial cooling flows, originally separated in the inner winding head chamber 40, now mix again in the outlet flow chamber 29. The first partial cooling flow, in accordance with FIG. 5, is returned through the lower left-hand penetration 26 according to the arrow direction denoted the reference number 27 and through the upper left-hand penetration 26' according to the arrow direction denoted by the reference number 27' into the outlet flow area 29. The second partial cooling flow is led as shown in FIG. 5 from the inner winding head chamber 40 in accordance with the arrow direction denoted by the reference number 5' first into the outer winding head chamber 40' and subsequently through the three by-pass openings 23, 23', 23'' located in the separating wall 16 in accordance with the arrow direction denoted by the reference numbers 41, 41', 41''. Both cooling gas partial flows, now heated and reunited in the cooling gas outlet flow chamber 29, are finally exhausted together in accordance with the arrow direction with the reference number 28 through the cooling gas outlet flow opening 14 of the stator end part 2a into the open air or are led to an installation, not shown in FIG. 5, for recooling the heated gas.

FIG. 1 shows an axonometric representation of the path of the cooling gas from the upper left-hand prismatic corner chamber 43 through the penetration 26' according to the arrow direction denoted by the reference number 27' into the left-hand cooling gas outlet flow chamber 29 of the stator end part 2a. The common emergence of both cooling gas partial flows again takes place according to the arrow direction with the reference number 28. The flow conditions of the cooling gas in the right-hand cooling gas outlet flow chamber 29' are once again represented clearly in FIG. 1. The cooling gas from the prismatic corner chamber 43'' passes in accordance with the arrow direction denoted by the reference number 25 through the penetration 18 in the end plate 3' into the right-hand outlet flow chamber 29' of the stator end part 2a. At the lower, not visible, by-pass opening and from the central by-pass opening 17, cooling gas enters the outlet flow chamber 29', in accordance with the arrow direction 24 in the case of the lower, not visible, by-pass opening and in accordance with the arrow direction 22 in the case of the central by-pass opening 17, and there mixes with the cooling gas partial flow conveyed through the rotor body 8 and the stator body 3 of the electrical machine and returns through the prismatic duct 43'' in accordance with the arrow direction denoted by the reference number 25. The conveyance of the cooling gas in the stator end part 2b occurs in exactly the same manner as that in the stator end part 2a, as is shown in FIG. 2. The cooling gas flows, in accordance with the arrow direction 20, through the inlet flow opening 13' into the induction space 19' of the stator end part 2b and, after previous separation into two partial flows and flowing through the components in the same way as is comprehensively described above with reference to FIGS. 1, 4, 5, is led into the left-hand outlet flow chamber, not shown, and the right-hand outlet flow chamber 31' of the stator end part 2b, and flows in accordance denoted by the arrow directions with the reference number 28 both out of the left-hand outlet flow chamber, which is not very visible, through the outlet flow opening 30 and out of the right-hand outlet flow chamber 31' through the outlet flow opening 30' out of the stator end part 2b.

It may also be seen from FIG. 2 that the heated cooling gas of the first partial flow flows back in the right-hand upper prismatic corner chamber 43''' in accordance with the arrow direction with the reference number 36 into the stator end part 2b. In the right-hand cooling gas outlet flow chamber 31' of the stator end part 2b, it then mixes with the second cooling gas partial flow simultaneously emerging from the by-pass openings 33, 33', 33'' in the separating wall 32' according to the arrow directions denoted by the reference numbers 34, 34', 34'' and both partial flows are then exhausted in common through the outlet opening 30' from the stator end part 2b.

In order to obtain optimum cooling, as will be described using FIG. 5, certain cross-sectional areas are needed for the penetrations 26, 26' and the by-pass openings 23, 23', 23" in the separating wall 16. The valid ratio of the sum of the cross-sectional areas $S_3$, $S_4$, $S_5$ of the by-pass openings 23, 23', 23" in the separating wall 16 to the sum of the cross-sectional areas $S_1$, $S_2$ of the penetrations 26, 26' is in the range from 0.15 to 0.3. This ratio obviously also applies to the right-hand cooling gas outlet flow chamber 29' of the stator end part 2a and also to the two cooling gas outlet flow chambers, the left-hand, not shown, and right-hand cooling gas outlet flow chambers 31', of the stator end part 2b. This ratio can be altered within the range quoted above by controlling the cross-sectional areas $S_3$, $S_4$, $S_5$ of the by-pass openings 23, 23', 23" by means of the displaceable cover plates 37, whereby the cooling effect can be directly and deliberately controlled towards the machine parts to be cooled in both the first and the second cooling circuits.

In order to obtain optimum flow velocity of the cooling gas in the cross-sectional area $S_6$ of the central part of the cooling gas outlet flow chamber 29, which, in accordance with FIG. 5, is given by the smallest distance between the casing 2' and the vertical part of the separating wall 16 over the total length of the separating wall 16, the ratio of $S_6$ with reference to the sum of the cross-sectional area $S_1$ of the lower penetration 26, the cross-sectional area $S_3$ of the lower by-pass opening 23 in the separating wall 16 and half the cross-sectional area $S_4$ of the central by-pass opening 23' in the separating wall 16, is greater that 1. This ratio obviously applies also to all other cooling gas outlet flow chambers 29, 31' in the stator end parts 2a, 2b.

In FIGS. 1 to 6, the invention has been presented using an illustrative embodiment in which the external contour of the sheet metal pack 3 has the shape of an approximately axisymmetric octagon. It is self-evident that the invention can also be applied in the case of alternating current machines with other sheet metal shapes, wherein the cooling gas outlet flow area of such machines is interrupted between the stator back and the machine casing over the total axial length of the stator central part and subdivided into individual partial cooling gas outlet flow areas not connected with one another in the peripheral direction. Thus, the invention is useful, for example, in the case of embodiments with six- or twelve-sided or circular shaped sheet metal outer contours and a square casing 1'. In this case also, ducts 43, 43', 43", 43"' are formed for the removal of the cooling gas in the casing corners, the ducts being bounded by the walls of the casing 1 and the backs of the metal sheets, separated by the sheet metal pack 3 and extending over the total length of the sheet metal pack.

Obviously, numerous modifications and variations of the present inventin are possible in light of the above teachings. It is therefore to be understood that within the scope of the appended claims, the invention may be practiced otherwise than as specifically described herein.

What is claimed as new and desired to be secured by Letters Patent of the United States is:

1. A gas cooled alternating current machines having a motor mounted on a shaft and surrounded by a stator, said rotor and said stator each having opposed ends, said stator having a stator central part including a laminated sheet metal pack and two stator end parts, a fan attached to said shaft at each rotor end and a shell mounted in association with the fan for conveying a cooling medium towards said stator and said rotor, the stator sheet metal pack being clamped between two end plates and subdivided by radially extending cooling ducts into individual partial packs, the stator sheet metal pack being surrounded by a casing having walls defining plural corners, comprising:

plural upper and lower ducts for the removal of the cooling gas formed in respective of the casing corners, said ducts bounded only by the walls of the casing and surfaces of the sheet metal pack separated by the sheet metal pack and extending over the total length of the sheet metal pack;

the stator end parts formed both as cooling gas inlet and cooling gas outlet casings, said stator end parts having a height corresponding approximately to that of the stator central part and widths protruding on both sides relative to the stator central part, each inlet and outlet casing including a separating wall which in conjunction with said shell substantially subdivides the respective inlet and outlet casing into four chambers, including a cooling gas induction chamber, a winding head chamber and a pair of cooling gas outlet flow chambers which are located symmetrically about a vertical plane;

each cooling gas outlet flow chamber having at least one outlet flow opening and each being connected to a respective lower duct and a respective upper duct of the stator central part via openings in the end plates of the stator central part;

said separating walls in each stator end part between the winding head chamber and the cooling gas outlet flow chambers being located in pairs symmetrically about the vertical plane and separating the winding head chamber and the cooling gas outlet flow chambers from one another; and said separating walls having by-pass openings through which cooling gas is led in a first cooling branch through the rotor and stator and in a second cooling branch in parallel to the first cooling branch through the stator winding head;

said separating walls in the stator end parts extending in an axial direction from the end plates to the shell allocated to the fans;

said separating walls defining a cross-section which at most coincides approximately with the external contour of the stator metal sheet and at least lies outside a hypothetical cylinder obtained by a circle inscribed on the sheet metal pack external contour; and said separating walls contacting a respective internal side of the lower and upper casing wall of the stator end parts and including by-pass openings approximately evenly distributed over the periphery thereof.

2. An alternating current machine according to claim 1, comprising:

the external contour of the sheet metal pack having a circular shape or the shape of an approximately axisymmetric n-sided polygon with n greater than 6;

said stator means metal pack having side surfaces running parallel to the casing walls in contact with their associated casing walls and radially supported thereby; and said walls of the casing protruding beyond said side surfaces of the stator sheet metal pack being solidly connected to one another to form said ducts for the removal of the cooling gas, which ducts extend over the complete length of the sheet metal pack.

3. An alternating current machine according to claim 1, wherein said separating walls comprise means for varying the effective cross-sectional areas of said by-pass openings.

4. An alternating current machine according to claim 3, comprising:
said separating walls in the stator end parts each having a vertical central part and angled lower and upper parts which extend axially from the end plates as far as said shells;
said separating walls being congruent with the external contour of the six side edges of the axisymmetric octagon of the sheet metal pack; and
said separating walls having said by-pass openings located respectively in the center of the central part and the angled lower and upper parts thereof.

5. An alternating current machine according to claim 3, wherein said varying means comprises:
cover plates displaceably located over the by-pass openings.

6. An alternating current machine according to claim 4, comprising:
said by-pass openings in the cooling gas outlet flow chamber defining respective free cross-sectional areas ($S_3$, $S_4$, $S_5$) and said end plate openings defining respective cross-sectional areas ($S_1$, $S_2$), wherein
the sum ($S_3+S_4+S_5$) of the free cross-sectional areas ($S_3$, $S_4$, $S_5$) of the by-pass openings in the cooling gas outlet flow chamber defining a first ratio relative to the sum ($S_1+S_2$) of the cross-sectional areas ($S_1$, $S_2$) of the end plate openings, said first ratio being in the range from 0.15 to 0.3.

7. An alternating current machine according to claim 6, comprising:
the cooling gas outlet flow chamber having a central part defining a cross-sectional area ($S_6$) given by the distance of a vertical central part of the separating walls from the casing wall of the stator end parts and the axial length of the separating walls, expressed as a second ratio to the sum of the cross-sectional area ($S_1$) of the lower end plate penetration and the free cross-sectional area ($S_3$) of the by-pass opening located in a lower angled part of the separating walls and half the free cross-sectional area ($S_4$) of the by-pass opening located in the central part of the separating walls, wherein said second ratio is greater than 1.

* * * * *